United States Patent [19]

Gaouditz et al.

[11] 4,022,655
[45] May 10, 1977

[54] DEVICE FOR LIMITING ACCIDENTAL PRESSURE OVERLOADS IN A NUCLEAR REACTOR CONFINEMENT STRUCTURE

[75] Inventors: Nicolas Gaouditz, Manosque; Edouard Le Borgne; Robert Mogavero, both of Aix-en-Provence, all of France

[73] Assignee: Commissariat a l'Energie Atomique, Paris, France

[22] Filed: Dec. 3, 1974

[21] Appl. No.: 529,095

[30] Foreign Application Priority Data

Dec. 12, 1973 France .............................. 73.44391
Dec. 12, 1973 France .............................. 73.44392

[52] U.S. Cl. .................................. 176/38; 176/65; 176/87
[51] Int. Cl.² ......................................... G21C 9/00
[58] Field of Search .................. 176/37, 38, 87, 61, 176/50; 165/179; 138/38

[56] References Cited

UNITED STATES PATENTS

| 2,335,687 | 11/1943 | Modine | 138/38 |
| 2,726,681 | 12/1955 | Gaddis et al. | 138/38 |
| 3,454,466 | 7/1969 | Pitt et al. | 176/38 |
| 3,715,270 | 2/1973 | Jackson | 176/38 |
| 3,870,081 | 3/1975 | Kleppe et al. | 138/38 |
| 3,871,407 | 3/1975 | Bykov et al. | 138/38 |
| 3,905,775 | 9/1975 | Sowards et al. | 23/288 |

FOREIGN PATENTS OR APPLICATIONS

| 1,589,770 | 8/1970 | Germany | 176/38 |
| 38-6548 | 12/1962 | Japan | 176/38 |
| 38-16198 | 8/1963 | Japan | 176/38 |
| 1,100,298 | 1/1968 | United Kingdom | 176/38 |

OTHER PUBLICATIONS

C&E News, "New Reactor Promises Competitive Power," 7/61, pp. 21–22.

*Primary Examiner*—Verlin R. Pendegrass
*Assistant Examiner*—Ralph Palo
*Attorney, Agent, or Firm*—Cameron, Kerkam, Sutton, Stowell & Stowell

[57] ABSTRACT

In a reactor confinement structure comprising a thin-walled inner reactor enclosure, a thick-walled outer enclosure, and an intermediate space containing water and an air cushion above the water, a communication between the enclosures is provided by bubbling ducts extending from the inner enclosure to a point below the water level. The flow of steam within each duct as a result of an accident condition within the inner enclosure is separated and then mixed with the water by means of a variable-depth partition system employed in conjunction with a system of injection nozzles and convergent-divergent tubes.

4 Claims, 6 Drawing Figures

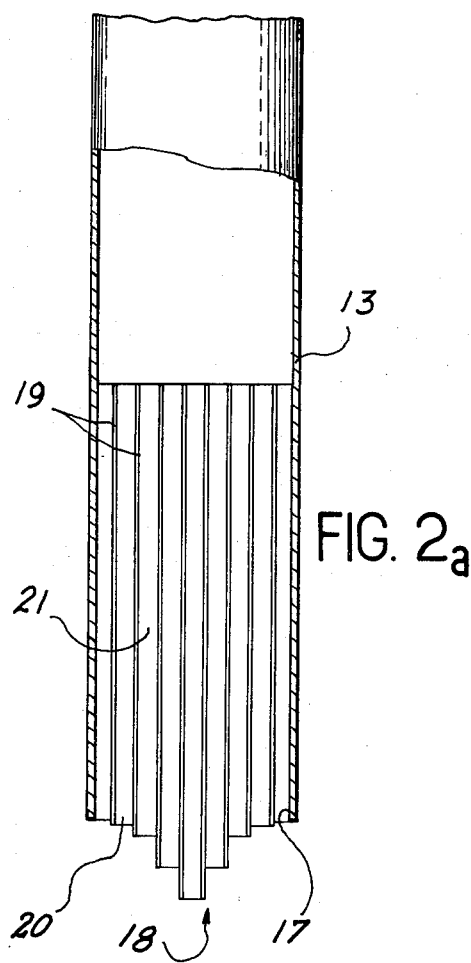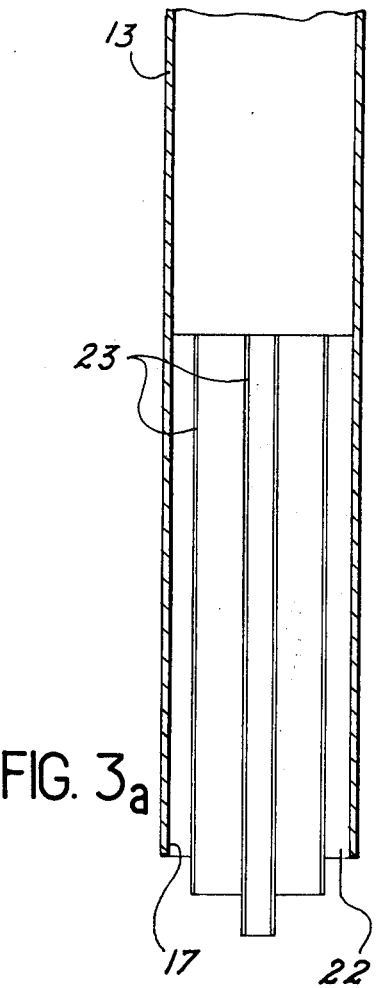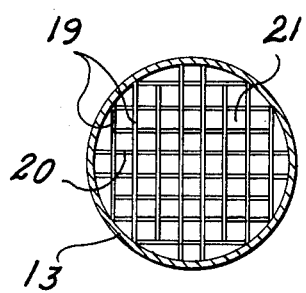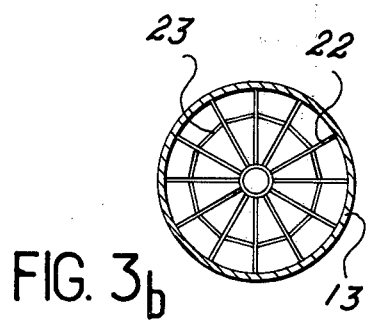

DEVICE FOR LIMITING ACCIDENTAL PRESSURE OVERLOADS IN A NUCLEAR REACTOR CONFINEMENT STRUCTURE

This invention relates to a device for limiting pressure overloads which are liable to be produced accidentally within an enclosure by the sudden formation of condensable vapors. The invention applies more especially to pressure overloads developed within a nuclear reactor confinement structure, particularly as a result of fast fracture of a duct for the circulation of a fluid which serves to cool the reactor core during operation.

The invention is preferentially although not exclusively applicable to the case in which the nuclear reactor under consideration is a boiling-water reactor or a pressurized-water reactor, the heat produced by the fission reacion within the core being extracted from this latter by a continuous two-phase flow of water and steam in the first case and of water in the second case. So far as presurized-water reactors are concerned, the pressurized water in the liquid state which passes through the reactor core gives up its heat to a secondary water circulation within a heat exchanger. In the case of boiling-water reactors, the steam produced as the water passes through the reactor core is utilized directly within a power production plant, especially by expansion within a turbine. In the event of a major accident condition arising in either of the reactor designs mentioned above and corresponding essentially to the fracture of a main duct for the circulation of coolant water, the steam which is immediately formed as a result of abrupt expansion produced by the fracture is dispersed within the reactor confinement structure ; the steam must therefore be maintained within this latter with maximum reliabiity and safety. Moreover, said confinement structure must be capable of withstanding the pressure which is produced, especially with a view to ensuring that the steam which may in some instances be contaminated cannot escape to the surrounding atmosphere.

Leak-tight structures or enclosures designed to withstand the excess pressure thus produced as a result of an accident of this type have already been built. However, these solutions entail heavy capital expenditure and give rise to certain difficulties in regard to practical application. Another more advantageous and conventional expedient consists in enclosing the reactor and the coolant water circuit within a first enclosure having relativey thin walls which is in turn contained within a second thick walled enclosure which has higher strength and is made especially of concrete. The intermediate space delimited between the two enclosures is partly filled with water in the liquid state at a temperature in the vicinity of ambient temperature, this volume of water being surmounted by an air cushion in equilibrium with the steam at the temperature considered. The two enclosures communicate with each other through ducts issuing at one end into the first enclosure and at the other end into the intermediate space beneath the level of the water contained therein. The object of said ducts is to permit dumping of the steam produced abruptly under accident conditions within the first enclosure by discharging said steam to the intermediate space after bubbling within the volume of water which cools said steam and causes practically complete condensation of this latter, thus removing any danger of an unacceptable pressure overload.

The present invention is concerned with an improvement in the arrangements of the type recalled in the foregoing, which makes it possible in particular to improve the conditions of steam bubbling in the volume of water of the intermediate space by ensuring more homogeneous mixing of the fluids which are present and consequently resulting in a lower pressure overload. The invention is also intended to reduce vibratory phenomena which occur as the steam passes through the ducts from the first enclosure to the intermediate space.

To this end, the device considered in which the confinement structure comprises a first thin-walled enclosure which contains the reactor and a water circuit for cooling the reactor core, said first enclosure being surrounded by a second high-strength enclosure having thick walls, the intermediate space delimited between said enclosures being partly filled with a volume of water in the liquid state surmounted by an air cushion, a communication between the enclosures for the discharge of a flow of steam derived from the first enclosure being established by means of bubbling ducts having their openings at one end in the wall of the first enclosure above the level of the volume of water in the liquid state within the intermediate space and immersed at the other end beneath this liquid level, is characterized in that each duct is provided with an internal partition system extending in a direction parallel to the axis of the duct so as to ensure a separation of the flow of steam within said duct and to break up the bubbles produced within the volume of water.

In accordance with another characteristic feature, the ends of the bubbling ducts which extend beneath the level of the volume of water in the liquid state within the intermediate space are arranged in steps with variable depths of immersion from one duct to the next.

The suitable distribution of the different bubbling ducts within the entire volume of liquid water of the intermediate space between the two enclosures thus makes it possible, by varying their depths of immersion and by virtue of their internal partition system, to absorb the maximum flow of steam produced as a result of any assumed accident condition by dumping said flow within the entire liquid mass which is thus uniformly employed.

As an advantageous feature, in order to prevent the bubbles from being re-formed in the case of a high steam flow rate at the extremity of the duct which is immersed beneath the liquid level, the partition system of each duct extends to a greater depth of immersion than that of the duct itself. Moreover and in accordance with another characteristic feature, the partition system of each duct delimits a plurality of parallel channels which are distributed over the cross-section of the duct, the depth of immersion of the extremities of said channels being of progressively decreasing value from the center to the periphery of said cross-section.

In a first alternative embodiment, the partition system of each duct is formed by means of flat plates extending in two directions at right angles to each other and delimiting square-section or rectangular-section channels between said plates. In another alternative embodiment, the partition system comprises flat plates disposed radially within each duct and tubular sleeves of increasing diameter which are disposed coaxially within the interior of the duct.

Since the limitation of pressure within the intermedite space above the volume of water in the liquid state constitutes an essential parameter of operational safety of the installation, the device in accordance with the invention makes it possible to ensure maximum efficiency, especially by producing a uniform temperature at all depths. In particular, the temperature at the surface is limited to the maximum extent, thus producing a corresponding reduction in the partial vapor pressure within the air cushion above the liquid volume and consequently in the total pressure on the outer confinement enclosure.

As an advantageous feature and in order to achieve a further improvement in the mixing of the steam within the volume of water of the intermediate space, a certain number of the bubbling ducts are each provided at the extremity which is immersed in the volume of water with an injection nozzle which cooperates with a convergent-divergent circulation tube or water-jet pump.

Finally and in accordance with a further characteristic feature of the device, the first enclosure is surrounded within the intermediate space and beneath the level of the volume of water by at least one small compartment delimited by one lateral wall, each small compartment being open at the top and intended to communicate with the volume of water by means of openings pierced in its lateral wall, the internal region of said small compartment being joined to the first enclosure by means of at least one additional bubbling duct extending to a very small depth within the volume of water. By reason of the partial vacuum produced within the first enclosure by the condensation of the steam remaining within this latter after the steam has completely escaped through the bubbling ducts, the additional duct aforesaid has the effect of accelerating the return to equilibrium with the intermediate space and above all of reducing the volume of water in the liquid state which is discharged into the first enclosure through the additional ducts aforesaid before said equilibrium is restored. Further characteristic features of a device for limiting accidental pressure overloads within a confinement structure of a pressurized-water reactor will become apparent from the following description of a number of exemplified embodiments which are given by way of indication without any limitation being implied, reference being made to the accompanying drawings, wherein:

FIGS. 2a and 2b are views respectively in longitudinal cross-section and in transverse cross-section to a larger scale and showing a bubbling duct ;

FIGS. 3a and 3b are views which are similar to FIGS. 2a and 2b but relate to an alternative form of construction ;

Figure 1:
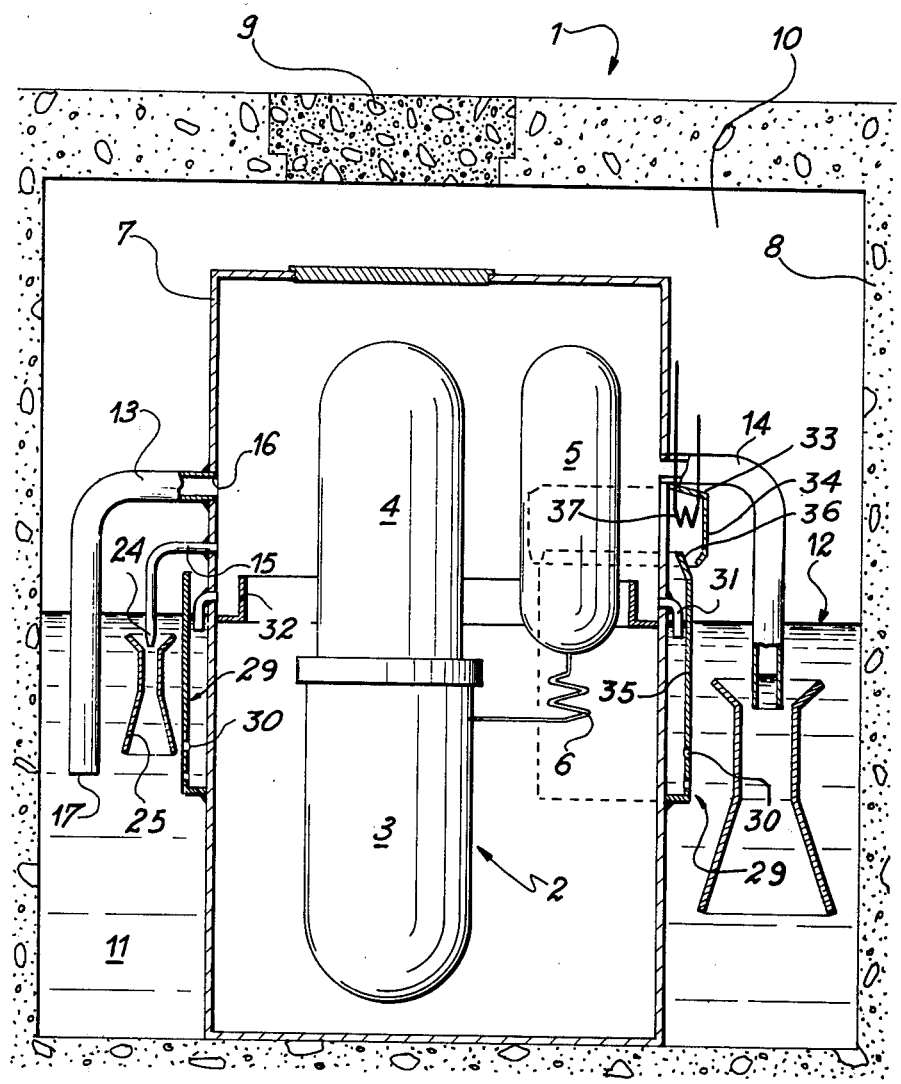
FIG. 1 is a diagrammatic transverse sectional view of a nuclear reactor equipped with a device in accordance with the invention.

As can be seen from FIG. 1, the reference numeral 1 generally designates the confinement structure of a nuclear reactor and especially of the type known as a pressurized-water reactor ; it should nevertheless be noted that, a mentioned earlier, the constructional arrangements which will be described are equally applicable to a reactor of the boiling-water type. The reactor comprises a nuclear boiler 2 formed by a leak-tight vessel 3 containing the reactor core and communicating with a top pressure shell 4 which encloses a heat exchanger. Thus the pressurized water which serves to extract heat as it passes through the reactor core is permitted by said heat exchanger to transfer its heat to a secondary fluid which is employed in a power production installation (not shown). The nuclear boiler 2 is associated with a pressurizing drum 5 and this latter is connected to the vessel 3 which contains the reactor core by means of a pipe 6, all these arrangements being conventional in themselves and wholly known in this technique.

The confinement structure 1 which contains the nuclear boiler 2 as thus constructed is composed of a first enclosure 7 having relatively thin walls, especially of steel, and in turn surrounded by a second high-strength enclosure 8 having walls of greater thickness an preferably of concrete, an opening being formed in the top wall or roof of said second enclosure 8 in order to provide access to the first enclosure and being normally closed by a shield plug 9. There is defined between the enclosures 7 and 8 an intermediate space 10 which is partly filled with a volume 11 of water in the liquid state at a temperature in the vicinity of room temperature. An air cushion which is in equilibrium with the steam at the temperature considered is present above the level 12 of said volume within the intermediate space. In addition, the enclosures 7 and 8 are put into communication with each other by means of a series of ducts or so-called bubbling ducts such as those designated in particular by the references 13, 14 and 15. Each bubbling duct as designated by the reference 13, for example, has a top extremity 16 which opens into the interior of the enclosure 7 above the level 12 within the intermediate space 10 whilst the opposite extremity 17 of said duct extends beneath the level 12 within the volume 11 of water in the liquid state.

The bubbling ducts aforesaid are distributed in series in which each duct has the same diameter, this diameter being different from one series to the next. By way of indication and in one form of construction in which the above-mentioned bubbling ducts are 35 in number, provision will preferably be made for two series consisting respectively of 25 ducts having a diameter of 300 mm and of ten ducts having a diameter of only 100 mm. Said bubbling ducts 13, 14 and 15 extend beneath the level 12 at immersion depths which are different from one duct to the next and are suitably distributed within the intermediate space, both around the first enclosure and across the width of said space. In the example mentioned above, twenty bubbling ducts having a diameter of 300 mm are intended to have an immersion depth of 2 m, five ducts having a diameter of 300 mm have an immersion depth of 1.5 m, eight ducts having a diameter of 100 mm have an immersion depth of 0.5 m and finally two ducts having a diameter of 100 mm have an immersion depth of 0.2 m.

The steam produce within the enclosure 1 as a result of abrupt expansion caused by an operational accident condition which can consist in particular of a fracture of a large-diameter duct in which is circulated the pressurized water for cooling the reactor core escapes under these conditions from the first enclosure 7 through all the bubbling ducts and is dispersed throughout the volume of water 11 in the liquid state within the intermediate space 10. Under these conditions, the mean temperature within said volume is made perfectly uniform; accordingly, the pressure within the intermediate space 10 above the level 12 which is directly dependent on the temperature of the air cushion contained in said space and on the temperature of the volume of water at the surface is limited to its minimum value irrespective of the quantity of steam derived from the first enclosure. By virtue of the distribution of the steam flow throughout the mass of liquid volume, the temperature rise remains at a minimum whilst the vapor pressure above the level of water also remains at the lowest value since this pressure increases with the temperature.

In order to avoid the pressure of vibrations within the bubbling ducts during the flow of steam, the interior of said ducts is arranged in the manner which is illustrated in particular in FIGS. 2 and 3. The lower portion of one of the bubbling ducts such as the duct 13, for example, is illustrated to a larger scale in FIGS. 2a and 2b. Said duct is provided with an internal partition system 18 formed by two families of plates 19 and 20 which are parallel to each other in each family and extend from one to the other in two perpendicular directions so as to delimit within the section of the duct a group of channels 21 of square or rectangular shape. The presence of these channels permits fractionation of the steam flow through the duct 13 and, in particular, makes it possible in the case of high values of flow rate to prevent the formation of bubbles having large dimensions which would be liable to impair the mechanical resistance of the structures as a whole. Moreover, and in accordance with another advantageous feature, the channels 21 are so arranged as to extend beyond the lower extremity 17 of the duct 13, the depths of immersion of said channel being greater at the center of said duct than at the periphery of this latter.

In another alternative embodiment which is illustrated in FIGS. 3a and 3b, the partition system of the duct 13 is obtained by means of radial plates 22 associated with sleeves 23 mounted within the interior of the duct and disposed coaxially with this latter so that the channels thus formed have the same effects as in the previous example.

Figure 4:
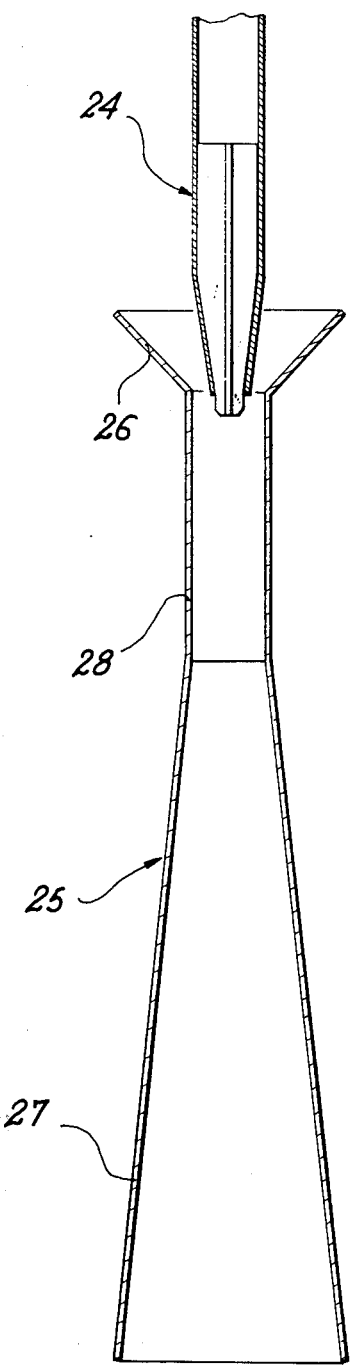
FIG. 4 is a detail view ot a larger scale showing an injection nozzle provided at the extremities of a certain number of bubbling ducts and associated with a circulation injection tube.

In order to ensure maximum efficiency and to achieve enhanced uniformity of temperatures at all depths within the volume of water of the intermediate space, the device can be improved by fitting injection nozzles 24 on the ends of a certain number of bubbling ducts which are placed beneath the level of the liquid volume, said nozzles being capable of cooperating with immersed convergent-divergent injector-tubes 25 or water-jet pumps. FIG. 4 illustrates to a larger scale the constructional detail of an assembly consisting of a nozzle 24 and injector-tube 25, said tube being provided with a convergent admission element 26 and a divergent discharge element 27, these two elements being joined to each other by a cylindrical duct or throat 28 which has a constant diameter. The water-jet pump effect which is produced in conjunction with the vacuum effect created by fast collapse of the steam bubbles endows this system with very high pumping efficiency. Moreover, it is apparent that the injector-tubes can be inclined to the vertical in order to give a preferential direction to the flow of water within the liquid volume and to ensure even higher uniformity of temperature within this latter.

When the enclosure 7 is filled with steam as a result of abrupt expansion of the pressurized water arising from a rupture of the main cooling circuit of the reactor, the steam is released through the bubbling ducts 13, 14 and 15. When this release is completed, there takes place within said enclosure a temperature drop and a condensation which results in a negative pressure with respect to the intermediate space 10.

In order to limit the effects of said negative pressure and in particular to accelerate the establishment of equilibrium of the first enclosure 7 with respect to the intermediate space, a further characteristic feature of the device according to the invention consists in fitting small boxes or compartments such as the compartment 29 on the external surface of the first enclosure 7 aforesaid. Each compartment 29 is open at the top end above the level 12 of the liquid volume within the space 10 and communicates with said volume by means of two small holes 30 form in its lateral wall. A bubbling duct 31 puts the interior of each compartment into communication with the interior of the first enclosure 7 and extends to a very small depth below the level 12. In the example of application which is more especially considered, one of the two bubbling tubes having a diameter of 100 mm can be immersed to a depth of 0.2 m below the level of liquid. Said ducts 31 accordingly achieve a considerable reduction in the volume of water which penetrates into the first enclosure as a result of the negative pressure and prior to the achievement of pressure equilibrium. Said volume of water can be collected within a small protective tank 32 which prevents splashing of water onto the boiler 2 and is placed within the enclosure 7 directly beneath the extremities of the ducts 31. In addition, provision can be made above the compartment 29 for a hood 33 having a flange 34 which forms a baffle-plate passage 36 with the shell 35 of the compartment. Said hood contains a tube-coil 37 which is located above the level of water within the compartment; cold water which performs the function of coolant is circulated within said tube-coil. The vapors above the level in the compartment condense on said coil and fall in a shower, thus limiting the pressure within the enclosure.

It is readily apparent that the invention is not limited in any sense to the example of construction which has been more especially described and illustrated but extends on the contrary to all alternative forms. In particular, it is worthy of note that no limitation has been contemplated in regard to the nature of the first enclosure 7 which can be formed in any suitable manner since said first enclosure is intended to withstand only the excess pressure which arises from the pressure drop within the bubbling ducts as well as the fast instantaneous pressure overload caused at the initial instant by the inertia of the water column contained within said ducts.

We claim:

1. A device for limiting accidental pressure overloads in a confinement structure of a nuclear reactor, comprising a first thin-walled enclosure which contains the reactor, a refrigerant circuit for cooling the reactor core in said first enclosure, said first enclosure being surrounded by a second high-strength enclosure having thick walls, an intermediate space defined between said enclosure partly filled with a volume of refrigerant in the liquid state, an air cushion above said volume in said space, means for communication between said enclosures including bubbling ducts opening at one end of the wall of said first enclosure above the level of the volume of refrigerant in the liquid state within said intermediate space and opening at the other end beneath said liquid level, each of said ducts having an internal partition system at the lower part of said other end extending in a direction parallel to the axis of the duct to separate the flow of gas within said duct and to break-up bubbles produced within the volume of refrigerant, said partition system of each of said ducts extending to a greater depth of immersion in said volume than that of said duct itself and defining a plurality of parallel channels distributed over the cross-section of said duct, the depth of immersion in said volume of the extremities of said channels being of progressively decreasing value from the center to the periphery of said cross-section.

2. A device according to claim 1, wherein said bubbling ducts opening beneath the level of the volume of refrigerant in the liquid state within said intermediate space open in steps with variable depths of immersion from one of said ducts to the next of said ducts.

3. A device according to claim 1, wherein the partition system of each of said ducts includes flat plates extending in two perpendicular directions defining square-section and also rectangular-section channels between said plates.

4. A device according to claim 1, wherein said partition system comprises flat plates disposed radially within each of said ducts and tubular sleeves of increasing diameter disposed coaxially within said duct.

* * * * *